(12) United States Patent
Koga et al.

(10) Patent No.: US 6,529,368 B2
(45) Date of Patent: Mar. 4, 2003

(54) GAS-INSULATED SWITCHGEAR

(75) Inventors: Hiromi Koga, Tokyo (JP); Yoshihiro Okawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/986,690

(22) Filed: Nov. 9, 2001

(65) Prior Publication Data

US 2002/0054474 A1 May 9, 2002

(30) Foreign Application Priority Data

Nov. 9, 2000 (JP) ........................................ 2000-342250

(51) Int. Cl.⁷ .............................................. H01H 33/66
(52) U.S. Cl. ....................................................... 361/605
(58) Field of Search ............................ 200/50.01, 50.32; 218/2, 3, 6, 7, 152–154; 439/186, 620; 361/605, 611, 612, 618

(56) References Cited

U.S. PATENT DOCUMENTS 3,983,345 A * 9/1976 Phillips ....................... 218/122
6,198,062 B1 * 3/2001 Mather et al. ............... 218/152

FOREIGN PATENT DOCUMENTS

| JP | 63-20337 | 2/1988 | .......... H01H/33/42 |
| JP | 2000-333323 | 11/2000 | .......... H02B/13/02 |

* cited by examiner

*Primary Examiner*—Gerald Tolin
(74) *Attorney, Agent, or Firm*—Sughrue Mion, PLLC

(57) ABSTRACT

A gas-insulated switchgear is miniaturized and bus-bars connected to bushings are simplified in configuration. A distance L between outer peripheries of a first vacuum interrupter 12 and a second vacuum interrupter 13 is established to be smaller than an external diameter D of the vacuum interrupters 12 to 14, and insulating barriers 28 to 30 are installed between the first vacuum interrupter 12 and the second vacuum interrupter 13, between the first vacuum interrupter 12 and a hermetically sealed container 11, between the second vacuum interrupter 13 and the hermetically sealed container 11, and between the first and second vacuum interrupters 12 and 13 and the third vacuum interrupter 14.

3 Claims, 4 Drawing Sheets

GAS-INSULATED SWITCHGEAR

BACKGROUND OF THE INVENTION

1. Technical Field

The present invention relates to a gas-insulated switchgear for breaking an electric power system in case of, for example, occurring any trouble in the electric power system.

2. Background Art

FIG. 5 is a partially cutaway front view of a conventional gas-insulated switchgear, and FIG. 6 is a side view taken along the line VI—VI in FIG. 5. In FIGS. 5 and 6, vacuum interrupters are located on the vertexes of a triangle having a horizontal base with their axes intersecting the triangle at right angles. That is, a first vacuum interrupter 1 is located on one vertex of the base, a second vacuum interrupter 2 is located on the other vertex of the base, and a third vacuum interrupter 3 is located on the remaining vertex all in a hermetically sealed container 4 filled with insulating gas. One terminal 1a of the first vacuum interrupter 1 is connected to a first bushing 5, a terminal 2a of the second vacuum interrupter 2 is connected to a second bushing 6, and a terminal 3a of the third vacuum interrupter 3 is connected to a third bushing 7. The bushings 5 to 7 are located on the axes of respective vacuum interrupters 1 to 3 and on a straight line parallel with the base of the triangle where the vacuum interrupters 1 to 3 are located. The bushings 5 to 7 are connected with bus-bars 8 to 10 respectively.

The conventional gas-insulated switchgear is constructed as described above, and consequently, in order to satisfy insulation performance between the vacuum interrupters 1 to 3 and between the first and second vacuum interrupters 1 and 2 and the hermetically sealed container 4, it is necessary to secure an insulation distance between them, and this causes a problem that it is difficult to downsize or miniaturize the gas-insulated switchgear.

Moreover, the bushings 5 to 7 are located on the straight line parallel with the base of the triangle where the vacuum interrupters 1 to 3 are located, and consequently, when the bus-bars 8 to 10 are arranged to be parallel with the base of the triangle where the vacuum interrupters 1 to 3 are located, there arises a problem that the bus-bars 8 to 10 are complicated in configuration.

SUMMARY OF THE INVENTION

The present invention was made to solve the above-discussed problems and has an object of providing a gas-insulated switchgear that can be miniaturized.

The invention has another object of providing a gas-insulated switchgear in which the bus-bars respectively connected to the bushings are simple in configuration.

A gas-insulated switchgear according to the invention is a gas-insulated switchgear in which vacuum interrupters are located on vertexes of a triangle with their axes intersecting a triangle at right angles with a first vacuum interrupter on one vertex of a base of the triangle, a second vacuum interrupter on the other vertex of the base, and a third vacuum interrupter on the remaining vertex and accommodated in a hermetically sealed container filled with an insulating gas, and one terminal of the first vacuum interrupter is connected to a first bushing, one terminal of the second vacuum interrupter is connected to a second bushing, and one terminal of the third vacuum interrupter is connected to a third bushing, wherein a distance L between outer peripheries of the first vacuum interrupter and the second vacuum interrupter is established to be smaller than an external diameter D of the vacuum interrupters, and insulating barriers are disposed between the first vacuum interrupter and the second vacuum interrupter, between the first vacuum interrupter and the hermetically sealed container, between the second vacuum interrupter and the hermetically sealed container, and between the first and second vacuum interrupters and the third vacuum interrupter.

As a result, the distance between the vacuum interrupters can be shortened, and it is possible to diminish the width of the hermetically sealed container and miniaturize the gas-insulated switchgear as a whole.

It is preferable that the first bushing is located on the axis of the first vacuum interrupter and on any one of three different virtual lines parallel with the base of the triangle, the second bushing is located on the axis of the second vacuum interrupter and on any one of the virtual lines excluding the virtual line where the first bushing is located, and the third bushing is located on the axis of the third vacuum interrupter and on the remaining virtual line.

As a result, although the bushings are located on the straight lines parallel with the base of the triangle where the vacuum interrupters are located, the bus-bars can be arranged forming straight lines. Consequently, it is possible to simplify the configurations of the bus-bars as a whole.

It is also preferable that the third bushing is located on the axis of the third vacuum interrupter and on any one of three different virtual lines parallel with the base of the triangle nearest to one terminal of the third vacuum interrupter, the first bushing is located on the axis of the first vacuum interrupter and on one of the virtual lines excluding the virtual line where the third bushing is located, and the second bushing is located on the axis of the second vacuum interrupter and on the remaining virtual line.

As a result, it is possible to diminish the size in the direction of extending the bushings.

DESCRIPTION OF THE PREFERRED EMBODIMENTS

Embodiment 1.

Figure 1:
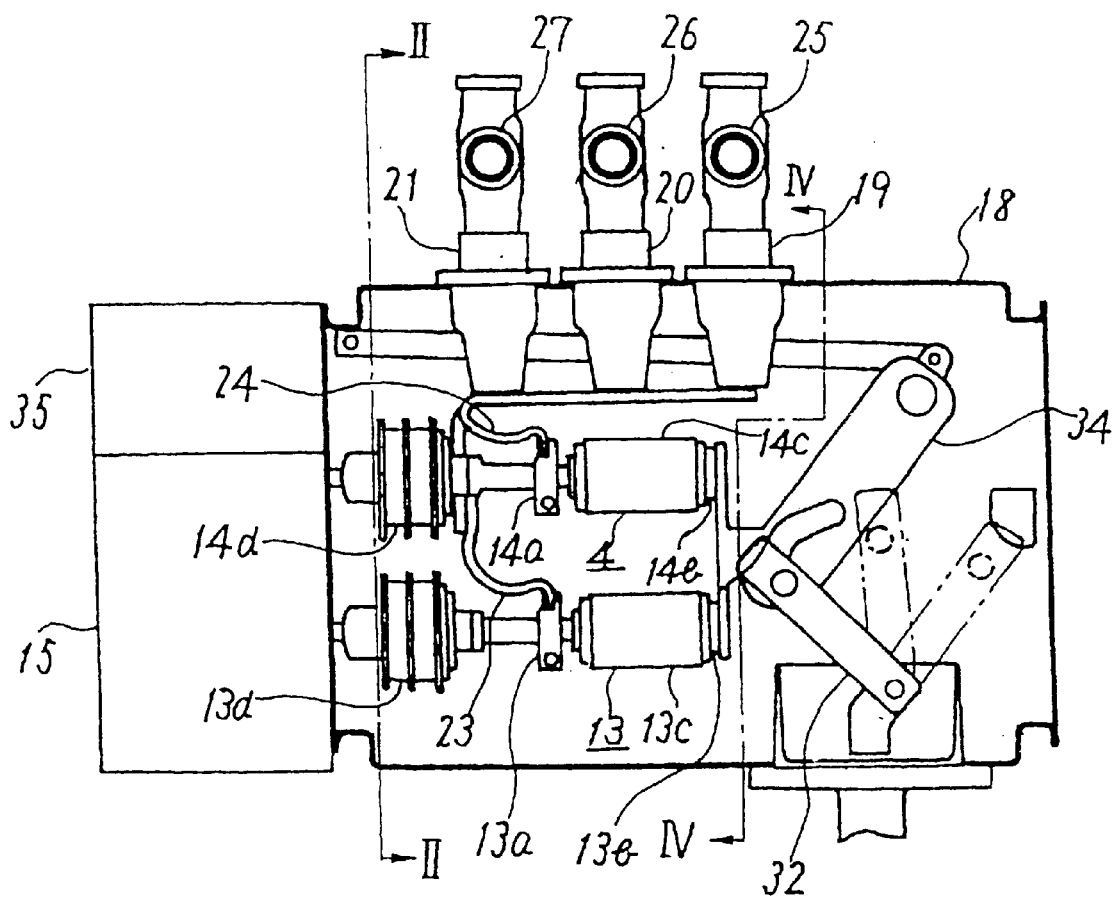
FIG. 1 is a partially cutaway front vew showing a construction according to Embodiment 1 of the invention.
Figure 2:
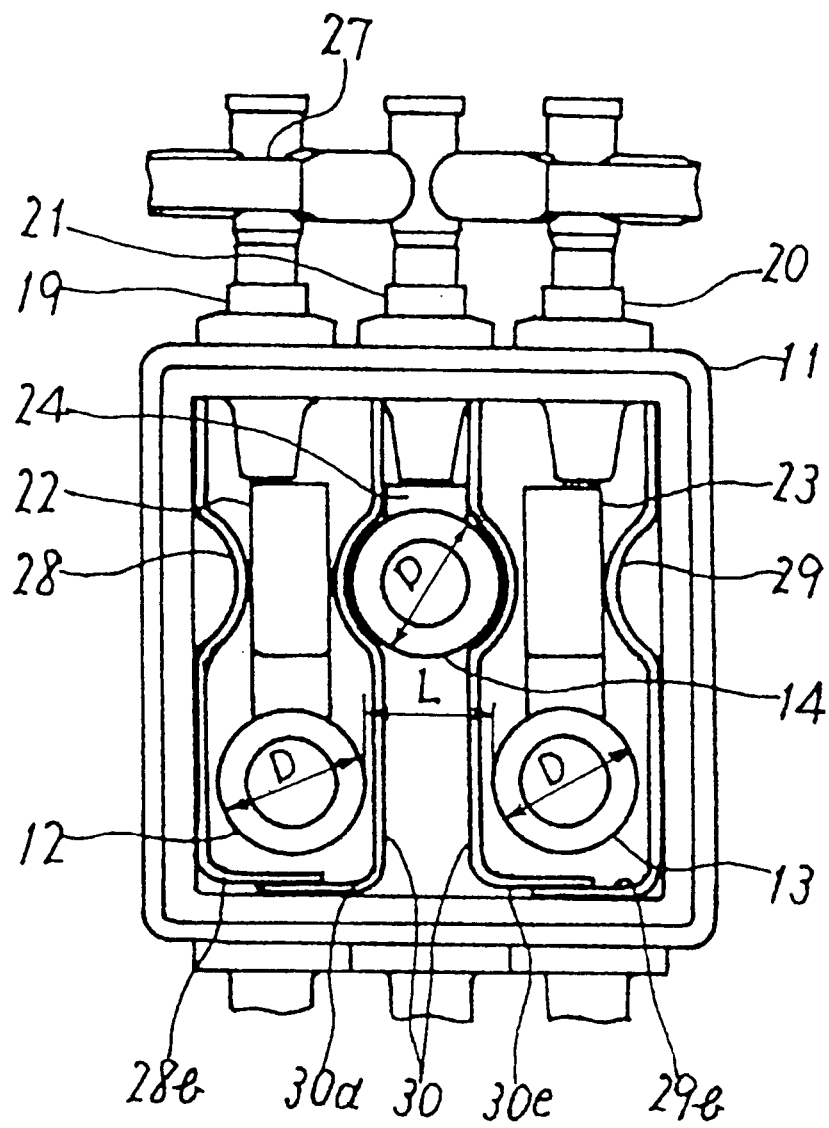
FIG. 2 is a side view taken along the line II—II in FIG. 1.
Figure 3:
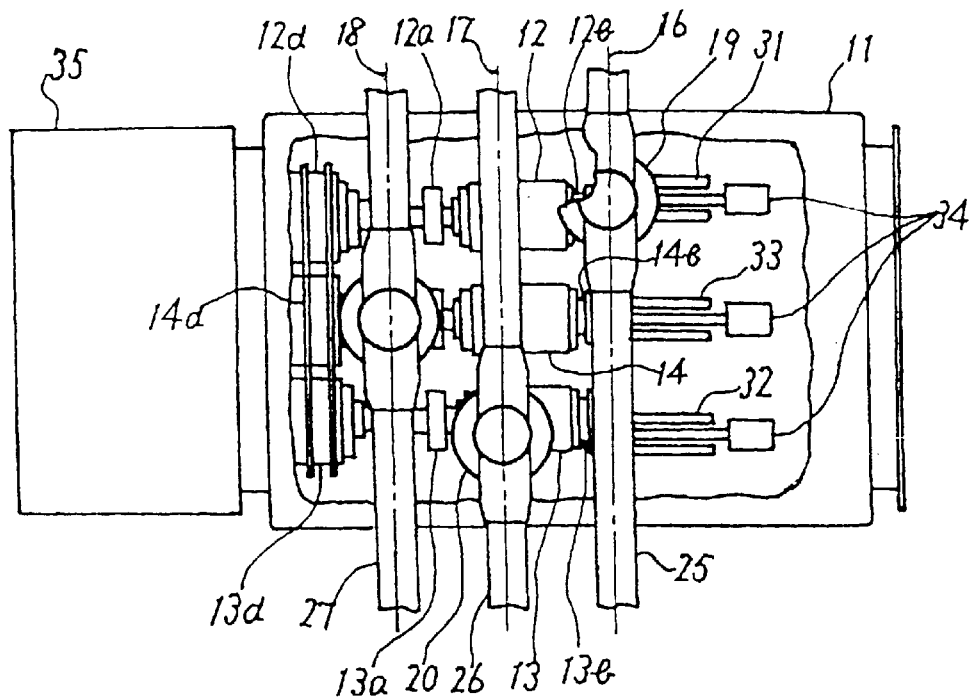
FIG. 3 is a front view with a part of FIG. 1 cut away.
Figure 4:
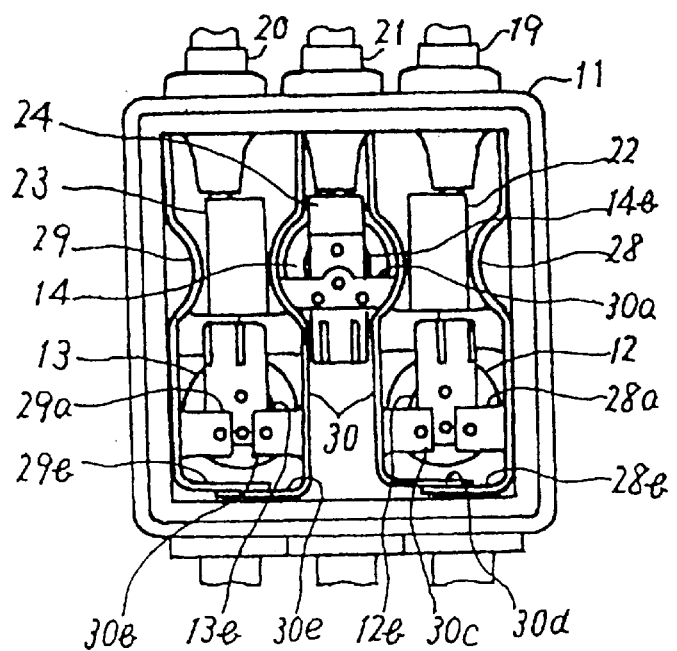
FIG. 4 is a side view taken along the line IV—IV in FIG. 1.
Figure 5:
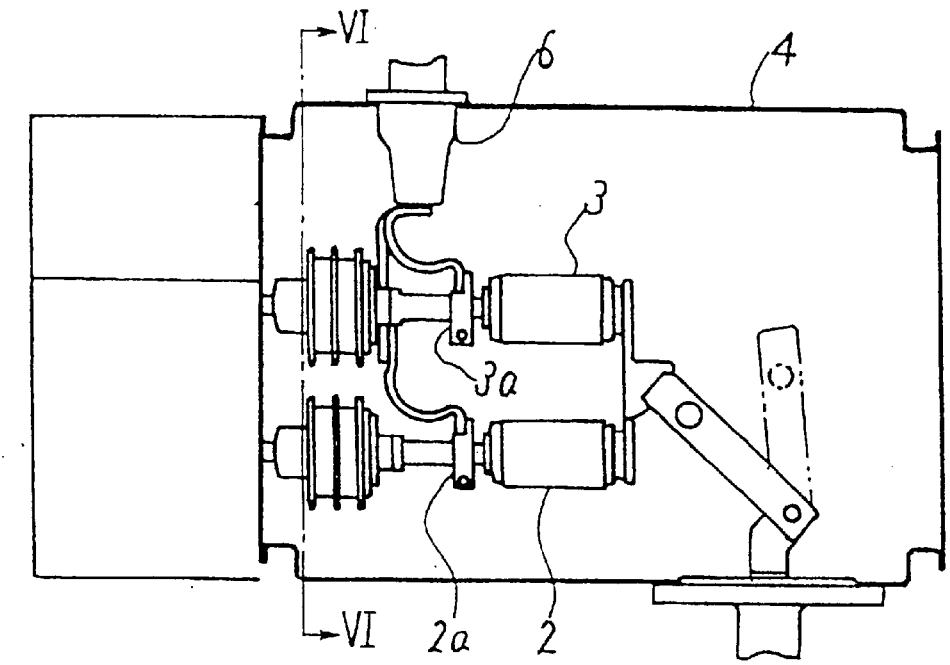
FIG. 5 is a partially cutaway front view of a conventional gas-insulated switchgear.
Figure 6:
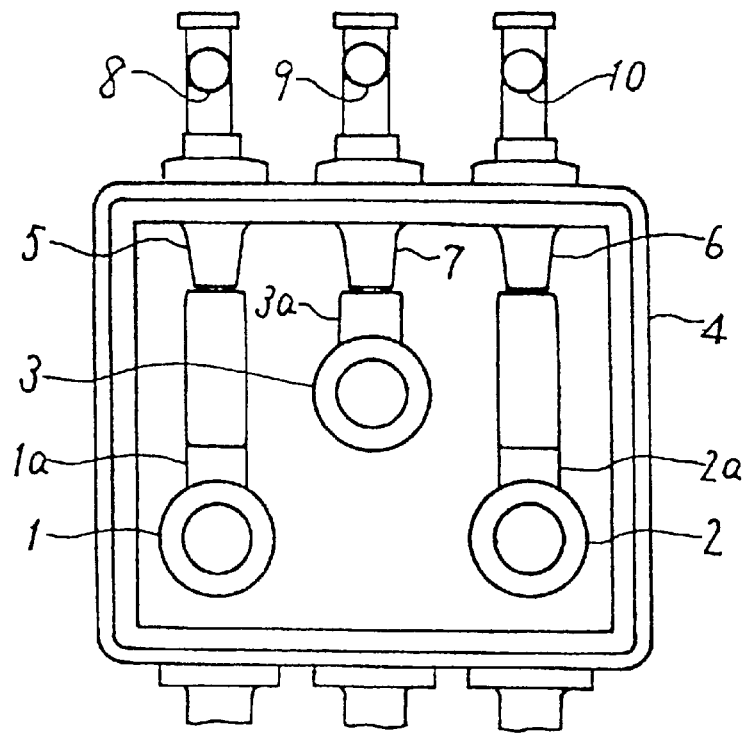
FIG. 6 is a side view taken along the line VI—VI in FIG. 5.

FIG. 1 is a partially cutaway front view showing a construction of Embodiment 1, FIG. 2 is a side view taken along the line II—II in FIG. 1, FIG. 3 is a front view with a part of FIG. 1 cut away, and FIG. 4 is a side view taken along the line IV—IV in FIG. 1. In FIGS. 1 to 4, reference numeral 11 is a hermetically sealed container filled with an insulating gas, numeral 12 is a first vacuum interrupter provided with terminals 12a and 12b and located on one vertex a horizontal base of a triangle with its axis intersecting the triangle at right angles. Numeral 13 is a second vacuum interrupter provided with terminals 13a and 13b and located on the other vertex of the base of the triangle with its axis intersecting the triangle at right angles. Numeral 14 is a third vacuum interrupter provided with terminals 14a and 14b and located on the remaining vertex of the triangle with its axis intersecting the triangle at right angles. The vacuum interrupters 12 to 14 are comprised of contact portions 12c, 13c, and 14c kept vacuum and insulating rods 12d, 13d, and 14d respectively. Numeral 15 is an operating mechanism for operating the vacuum interrupters 12 to 14, and the operating mechanism 15 is connected to each of the insulating rods 12d to 14d. A distance L between outer peripheries of the first vacuum interrupter 12 and the second vacuum interrupter 13 is established to be smaller than external diameter D of the vacuum interrupters 12 to 14. Numerals 16 to 18 are three different virtual lines parallel with the base of the triangle. Numeral 19 is a first bushing connected to one terminal 12a of the first vacuum interrupter 12 and located on a position intersecting with the virtual line 16 most distant from the terminal 12a on the axis of the first vacuum interrupter 12.

Numeral 20 is a second bushing connected to one terminal 13a of the second vacuum interrupter 13 and located on a position intersecting with the central virtual line 17 on the axis of the second vacuum interrupter 13. Numeral 21 is a third bushing connected to one terminal 14a of the third vacuum interrupter 14 and located on a position intersecting with the virtual line 18 nearest to the one terminal 14a of the third vacuum interrupter 14. Numeral 22 is a connecting wire for connecting the terminal 12a of the first vacuum interrupter 12 and the first bushing 19, numeral 23 is a connecting wire for connecting the terminal 13a of the second vacuum interrupter 13 and the second bushing 20, and numeral 24 is a connecting wire for connecting the terminal 14a of the third vacuum interrupter 14 and the third bushing 21. Numerals 25 to 27 are bus-bars arranged in the direction of the virtual lines 16 to 18 and connected to the bushings 19 to 21 respectively. Numeral 28 is an insulating barrier installed between the first vacuum interrupter 12 and the hermetically sealed container 11 with an upper portion thereof fixed to the hermetically sealed container 11, and a fitting portion 28a supports the other terminal 12b side of the first vacuum interrupter 12. Numeral 29 is an insulating barrier installed between the second vacuum interrupter 13 and the hermetically sealed container 11 with an upper portion thereof fixed to the hermetically sealed container 11, and a fitting portion 29a supports the other terminal 13b side of the second vacuum interrupter 13.

Numeral 30 is an insulating barrier installed between the first and second vacuum interrupters 12 and 13 and the third vacuum interrupter 14 with an upper portion thereof fixed to the hermetically sealed container 11, and a fitting portion 30a supports the other terminal 14b side of the third vacuum interrupter 14. Furthermore, a fitting portion 30b of the insulating barrier 30 supports the other terminal 13b side of the second vacuum interrupter 13, and a fitting portion 30c supports the other terminal 12b side of the first vacuum interrupter 12. The insulating barriers 28 to 30 are provided with overlapping portions 28b, 29b, 30d and 30e so that lower portions of the insulating barriers 28 to 30 may overlap each other. Numerals 31 to 33 are disconnectors connected to the other terminals 12b to 14b of the vacuum interrupters 12 to 14 respectively, and each disconnector is opened and closed by an operating mechanism 35 through a link mechanism 34.

As described above, the distance L between the outer circumferences of the first vacuum interrupter 12 and the second vacuum interrupter 13 is established to be smaller than the external diameter D of the vacuum interrupters 12 to 14, and insulating barriers 28 to 30 are installed between the first vacuum interrupter 12 and the second vacuum interrupter 13, between the first vacuum interrupter 12 and the hermetically sealed container 11, between the second vacuum interrupter 13 and the hermetically sealed container 11, and between the first and second vacuum interrupters 12 and 13 and the third vacuum interrupter 14. As a result, it is possible to shorten the distance between the vacuum interrupters 12 to 14, and it is possible to miniaturize the hermetically sealed container 11 and small size the gas-insulated switchgear as a whole.

The distance L between the outer circumferences of the first vacuum interrupter 12 and the second vacuum interrupter 13 is established to be smaller than the external diameter D of the vacuum interrupters 12 to 14, and insulating barriers 28 to 30 are installed between the first vacuum interrupter 12 and the second vacuum interrupter 13, between the first vacuum interrupter 12 and the hermetically sealed container 11, between the second vacuum interrupter 13 and the hermetically sealed container 11, and between the first and second vacuum interrupters 12 and 13 and the third vacuum interrupter 14. As a result, it is possible to ensure insulation performance between the first and second vacuum interrupters 12 and 13 and the hermetically sealed container 11 and between the vacuum interrupters 12 to 14.

The first bushing 19 is located on the axis of the first vacuum interrupter 12 and on one of the three different virtual lines 16 to 18 parallel with the base of the triangle, the second bushing 20 is located on the axis of the second vacuum interrupter 13 and on one of the virtual lines 16 to 18 excluding the virtual line where the first bushing 19 is located, and the third bushing 21 is located on the axis of the third vacuum interrupter 14 and on the remaining virtual line. As a result, the bus-bars 25 to 27 can be arranged forming straight lines even though the bushings 19 to 21 are located on the straight lines parallel with the base of the triangle where the vacuum interrupters 12 to 14 are located, and consequently it is possible to simplify the construction of the configurations of the bus-bars 25 to 27.

The third bushing 21 is located on the axis of the third vacuum interrupter 14 and on the virtual line 18, which is one of the three different virtual lines 16 to 18 parallel with the base of the triangle and is nearest to the terminal 14a of the third vacuum interrupter 14, the first bushing 19 is located on the axis of the first vacuum interrupter 12 and on one of the virtual lines 16 and 17 excluding the virtual line 18 where the third bushing 21 is located, and the second bushing 20 is located on the axis of the second vacuum interrupter 13 and on the remainder of the virtual lines 16 and 17. As a result, it is possible to diminish the distance in the direction of extending the bushings 25 to 27.

Furthermore, overlapping the overlapping portion 28b of the insulating barrier 28 and the overlapping portion 30d of the insulating barrier 30 makes it possible to strengthen insulation performance between the first vacuum interrupter 12 and the hermetically sealed container 11. Likewise overlapping the overlapping portion 29b of the insulating barrier 29 and the overlapping portion 30e of the insulating barrier 30 makes it possible to strengthen insulation performance between the second vacuum interrupter 13 and the hermetically sealed container 11.

In this Embodiment 1, the vacuum interrupters are located on the vertexes of the triangle having the horizontal base with their axes intersecting the triangle at right angles with the first vacuum interrupter 12 on one vertex of the base, the second vacuum interrupter 13 on the other vertex of the base, and the third vacuum interrupter 14 on the remaining vertex in the hermetically sealed container 11 filled with an insulating gas. The same advantage is obtained when arranging the base of the triangle to come in vertical direction or any other direction.

What is claimed is:

1. A gas-insulated switchgear in which vacuum interrupters are located on vertexes of a triangle with their axes intersecting a triangle at right angles with a first vacuum interrupter on one vertex of a base of the triangle, a second vacuum interrupter on the other vertex of the base, and a third vacuum interrupter on the remaining vertex and accommodated in a hermetically sealed container filled with an insulating gas, and one terminal of said first vacuum interrupter is connected to a first bushing, one terminal of said second vacuum interrupter is connected to a second bushing, and one terminal of said third vacuum interrupter is connected to a third bushing, wherein a distance L between outer peripheries of said first vacuum interrupter and said second vacuum interrupter is established to be smaller than an external diameter D of said vacuum interrupters, and insulating barriers are disposed between said first vacuum interrupter and said second vacuum interrupter, between said first vacuum interrupter and said hermetically sealed container, between said second vacuum interrupter and said hermetically sealed container, and between said first and second vacuum interrupters and said third vacuum interrupter.

2. A gas-insulated switchgear in which vacuum interrupters are located on vertexes of a triangle with their axes intersecting a triangle at right angles with a first vacuum interrupter on one vertex a base of the triangle, a second vacuum interrupter on the other vertex of the base, and a third vacuum interrupter on the remaining vertex and accommodated in a hermetically sealed container filled with an insulating gas, and one terminal of said first vacuum interrupter is connected to a first bushing, one terminal of said second vacuum interrupter is connected to a second bushing, and one terminal of said third vacuum interrupter is connected to a third bushing, wherein said first bushing is located on the axis of said first vacuum interrupter and on any one of three different virtual lines parallel with the base of said triangle, said second bushing is located on the axis of said second vacuum interrupter and on any one of the virtual lines excluding said virtual line where said first bushing is located, and said third bushing is located on the axis of said third vacuum interrupter and on the remaining virtual line.

3. A gas-insulated switchgear in which vacuum interrupters are located on vertexes of a triangle with their axes intersecting a triangle at right angles with a first vacuum interrupter on one vertex a base of the triangle, a second vacuum interrupter on the other vertex of the base, and a third vacuum interrupter on the remaining vertex and accommodated in a hermetically sealed container filled with an insulating gas, and one terminal of said first vacuum interrupter is connected to a first bushing, one terminal of said second vacuum interrupter is connected to a second bushing, and one terminal of said third vacuum interrupter is connected to a third bushing, wherein said third bushing is located on the axis of said third vacuum interrupter and on any one of three different virtual lines parallel with the base of said triangle nearest to one terminal of the third vacuum interrupter, said first bushing is located on the axis of said first vacuum interrupter and on one of the virtual lines excluding said virtual line where said third bushing is located, and said second bushing is located on the axis of the second vacuum interrupter and on the remaining virtual line.

\* \* \* \* \*